(12) United States Patent
Maruyama

(10) Patent No.: US 8,560,200 B2
(45) Date of Patent: Oct. 15, 2013

(54) DRIVING SUPPORT APPARATUS FOR VEHICLE

(75) Inventor: Tasuku Maruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/433,227

(22) Filed: Mar. 28, 2012

(65) Prior Publication Data

US 2012/0253629 A1 Oct. 4, 2012

(30) Foreign Application Priority Data

Mar. 30, 2011 (JP) .................................. 2011-076030

(51) Int. Cl.
*B60T 7/12* (2006.01)
*G01S 13/00* (2006.01)
*G01S 3/02* (2006.01)
*B60Q 1/00* (2006.01)
*G08G 1/16* (2006.01)
*B60K 31/00* (2006.01)

(52) U.S. Cl.
USPC ............... 701/96; 342/70; 342/455; 340/435; 340/903; 180/170

(58) Field of Classification Search
USPC ........... 701/23, 25, 28, 41, 70, 79, 91, 93, 96, 701/110, 119, 428, 301, 302, 98, 300; 340/988–996, 435, 436, 903; 342/70, 342/71, 72, 90, 455, 456, 109, 454; 180/167–169, 176–179, 170; 123/350, 123/352; 356/4.01
See application file for complete search history.

(56) References Cited

U.S. PATENT DOCUMENTS

2003/0078718 A1* 4/2003 Takenaga et al. ............... 701/96
2006/0265115 A1* 11/2006 Etori et al. ...................... 701/96
2009/0164109 A1* 6/2009 Maruyama .................... 701/116

FOREIGN PATENT DOCUMENTS

JP 2001-225669 A 8/2001

* cited by examiner

*Primary Examiner* — Muhammad Shafi
(74) *Attorney, Agent, or Firm* — McGinn IP Law Group, PLLC

(57) ABSTRACT

Provided is a driving support apparatus for a vehicle. When a stop signal is recognized by a stereo image recognition device, a cruise control unit calculates a traffic signal target acceleration for making a subject vehicle stop at a stop position of the stop signal. When a follow-up cruise target acceleration is not calculated and the traffic signal target acceleration is calculated, the cruise control unit substitutes the traffic signal target acceleration for the follow-up cruise target acceleration. When the follow-up cruise target acceleration and the traffic signal target acceleration are calculated and the traffic signal target acceleration is smaller than the follow-up cruise target acceleration, the cruise control unit substitutes the value of the traffic signal target acceleration for the follow-up cruise target acceleration.

13 Claims, 7 Drawing Sheets

# DRIVING SUPPORT APPARATUS FOR VEHICLE

CROSS-REFERENCE TO RELATED APPLICATIONS

The present application claims priority from Japanese Patent Application No. 2011-076030 filed on Mar. 30, 2011, the entire contents of which are hereby incorporated by reference.

BACKGROUND OF THE INVENTION

1. Field of the Invention

The present invention relates to a driving support apparatus for a vehicle performing cruise control through throttle control and brake application control.

2. Description of Related Art

In related art, there have been various proposals for driving support apparatuses configured to recognize a vehicle exterior environment in front of a subject vehicle by using a millimeter wave radar, an infrared laser radar, a stereo camera, a monocular camera or the like, and perform cruise control or the like of the subject vehicle based on the recognized vehicle exterior environment. As an example of such cruise control functions, there is widely known a function of performing follow-up cruise control to follow a preceding vehicle when such a preceding vehicle is detected (captured) in front of a subject vehicle. Typically, the follow-up cruise control has been widely in practical use as part of adaptive cruise control (ACC). In the ACC, the follow-up cruise control is performed in a state where a vehicle is detected in front of a subject vehicle, while constant speed cruise control at a set vehicle speed set by a driver is performed in a state where no preceding vehicle is detected. Furthermore, in recent years, techniques of extending the range to which the follow-up cruise control is applied to a very low speed and stopping a subject vehicle while maintaining a constant inter-vehicle distance when a preceding vehicle has stopped (follow-up stop control) have been developed and in practical use.

For example, Japanese Patent Application Laid-Open (JP-A) No. 2001-225669 discloses a technique of performing control of the opening degree of an electronic throttle and drive control of a brake actuator so as to keep the inter-vehicle time period at a target time period when the subject vehicle speed is higher than 20 km/h, and performing control of the opening degree of the electronic throttle and drive control of the brake actuator so as to accelerate or decelerate the subject vehicle in proportion to a deviation of an inter-vehicle distance to the front vehicle from a minimum inter-vehicle distance (=10 m) when the subject vehicle speed is 20 km/h or lower. In addition, JP-A No. 2001-225669 discloses a technique of decreasing the subject vehicle speed to a very low speed (5 km/h, for example) when stopping of a preceding vehicle is detected, and performing control of the opening degree of the electronic control throttle and drive control of the brake actuator so as to stop the subject vehicle at a point where the inter-vehicle distance becomes a stopping inter-vehicle distance (=5 m).

An example of a possible situation in which a preceding vehicle stops or decelerates is that a stop signal (a yellow light or a red light) is present ahead on a road on which the subject vehicle is traveling.

With the techniques disclosed in JP-A No. 2001-225669 described above, however, the subject vehicle is decelerated following the deceleration of the preceding vehicle. Therefore, the subject vehicle may not be decelerated promptly even though the driver has recognized a stop signal. Accordingly, it is desired to perform suitable cruise control against an extended range of objects to cover traffic signals on the road on which the subject vehicle is traveling in addition to the preceding vehicle so as to improve the convenience of the ACC.

SUMMARY OF THE INVENTION

The present invention has been made in view of the aforementioned circumstances, and aims to provide a driving support apparatus for a vehicle capable of performing suitable cruise control against an extended range of objects to cover a traffic signal present on a road on which a subject vehicle is traveling in addition to a preceding vehicle.

A driving support apparatus for a vehicle according to an aspect of the present invention includes: a constant speed cruise target acceleration calculating unit configured to calculate a constant speed cruise target acceleration for bringing a subject vehicle speed closer to a set vehicle speed set by a driver; a preceding vehicle recognizing unit configured to recognize a preceding vehicle; a follow-up cruise target acceleration calculating unit configured to calculate a follow-up cruise target acceleration for follow-up cruise following a preceding vehicle when the preceding vehicle is recognized by the preceding vehicle recognizing unit; an acceleration/deceleration controlling unit configured to control acceleration/deceleration of the subject vehicle by selectively using the constant speed cruise target acceleration or the follow-up cruise target acceleration; a stop signal recognizing unit configured to recognize a traffic signal displaying an instruction to stop to the subject vehicle; and a traffic signal target acceleration calculating unit configured to calculate a traffic signal target acceleration for stopping the subject vehicle at a stop position of a stop signal when the stop signal is recognized by the stop signal recognizing unit. The follow-up cruise target acceleration calculating unit substitutes the traffic signal target acceleration for the follow-up cruise target acceleration when the follow-up cruise target acceleration is not calculated and the traffic signal target acceleration is calculated, and substitutes a value of the traffic signal target acceleration for the follow-up cruise target acceleration when the follow-up cruise target acceleration and the traffic signal target acceleration are calculated and the traffic signal target acceleration is smaller than the follow-up cruise target acceleration.

DETAILED DESCRIPTION OF THE PREFERRED EMBODIMENT

Figure 2:
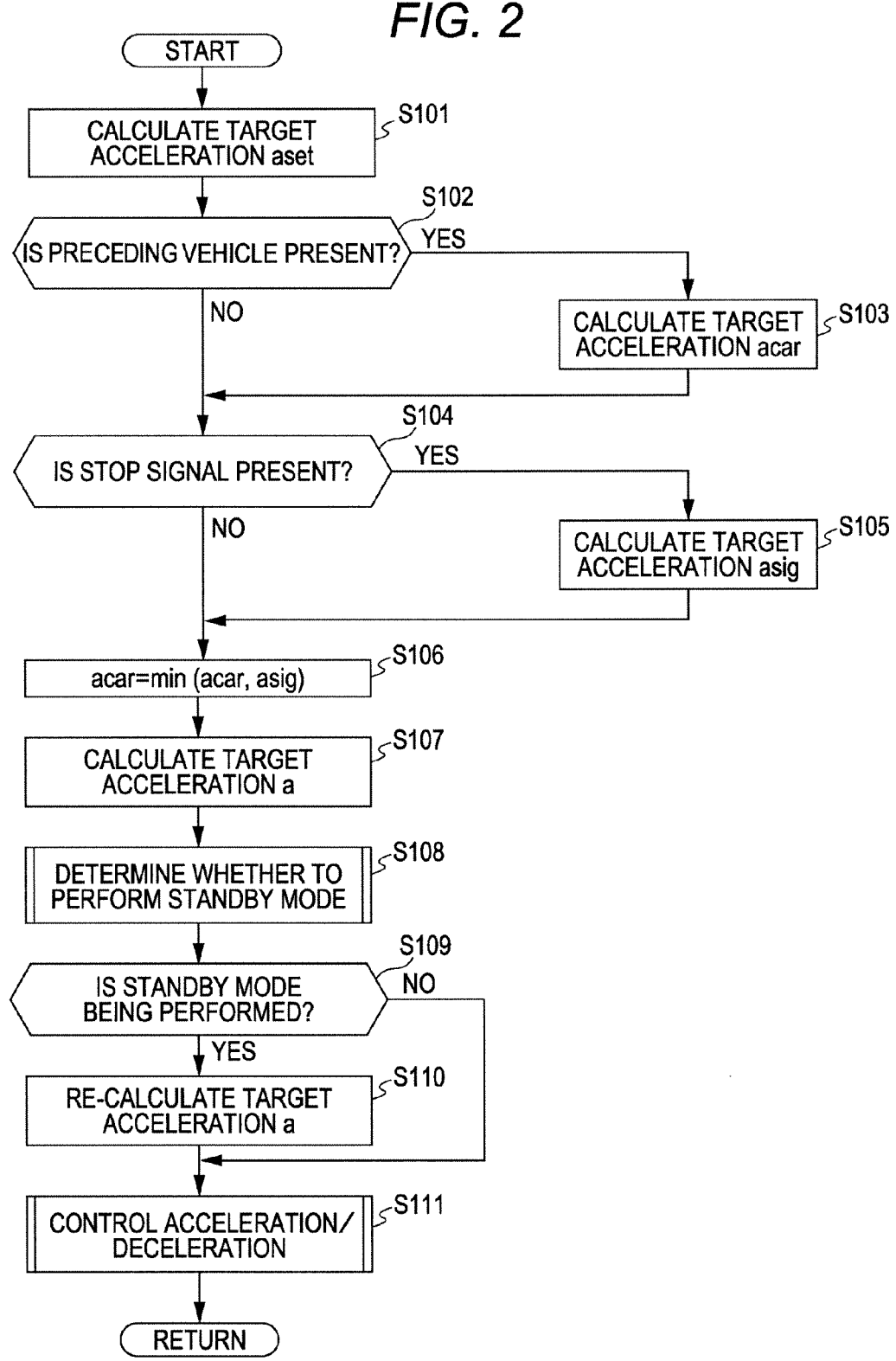
FIG. 2 is a flowchart showing a cruise control routine.
Figure 3:
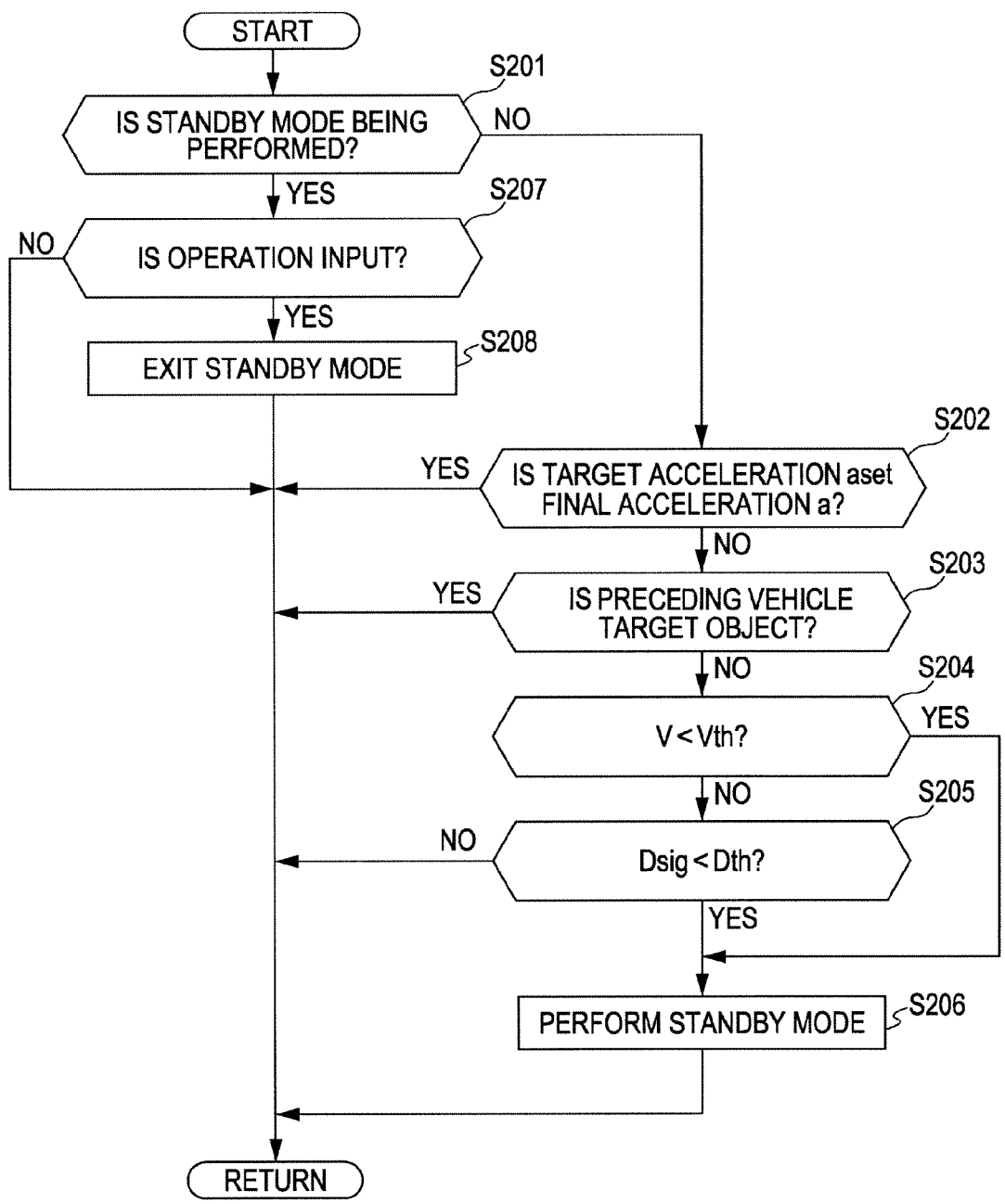
FIG. 3 is a flowchart showing a standby mode determining sub-routine.
Figure 4:
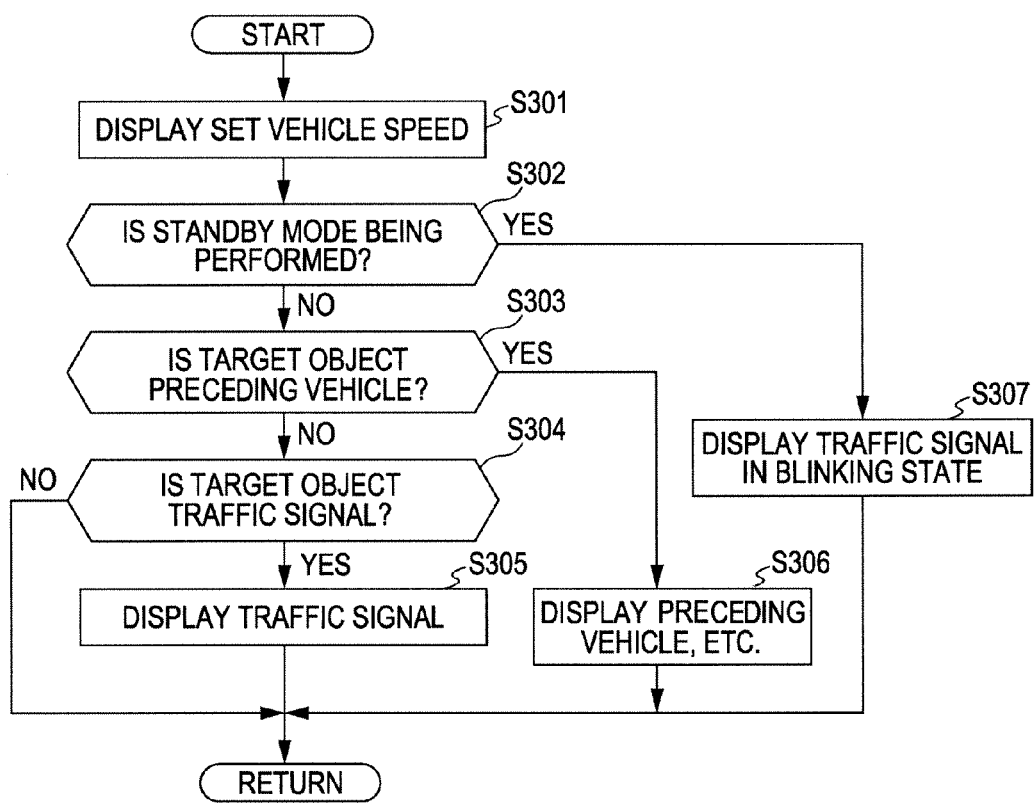
FIG. 4 is a flowchart showing a routine of controlling display on a display device for cruise control.
Figure 6A:
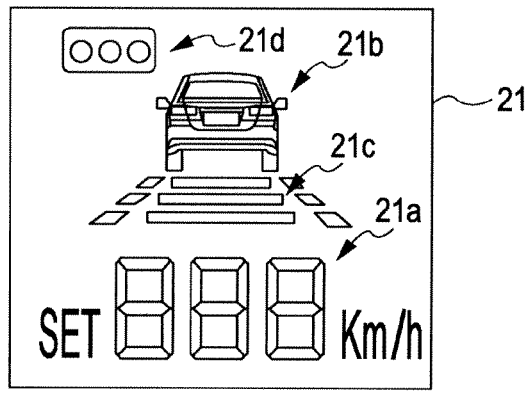
FIG. 6A is an explanatory diagram showing indicators on the display device for cruise control.
Figure 6B:
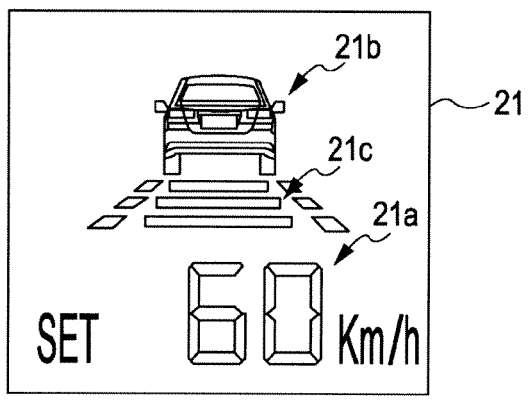
FIG. 6B is an explanatory diagram showing an example of display when a preceding vehicle is a target object.
Figure 6C:
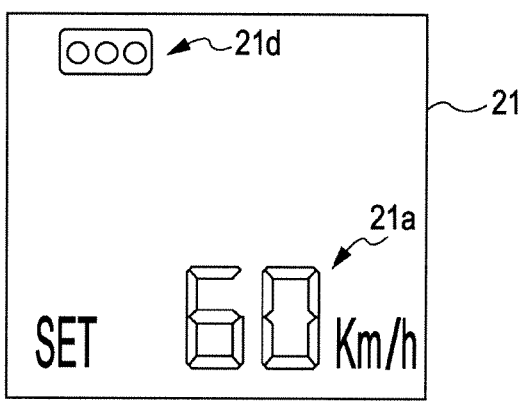
FIG. 6C is an explanatory diagram showing an example of display when a traffic signal is a target object.
Figure 7:
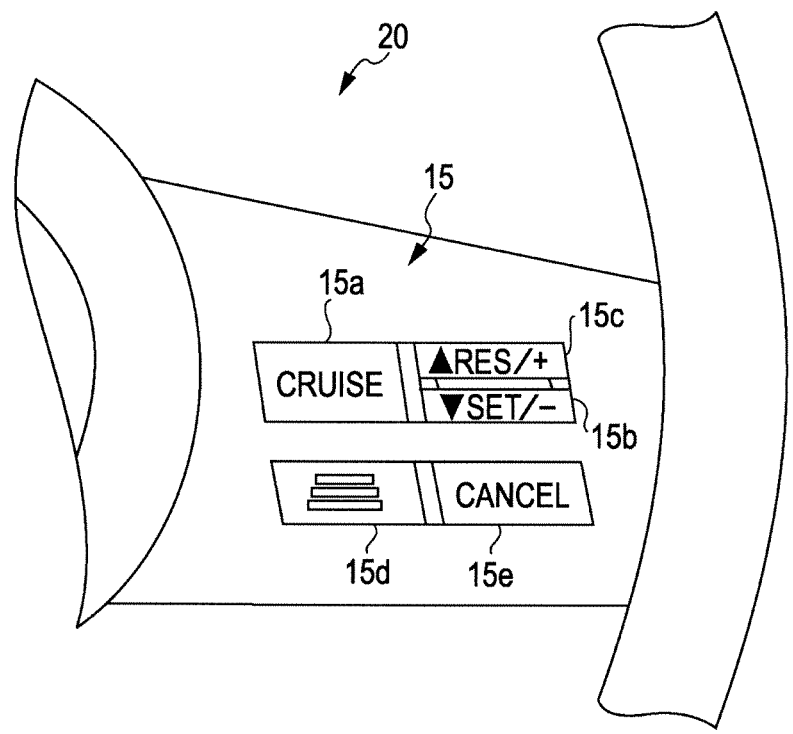
FIG. 7 is a plan view showing an example of a cruise control switch.

An embodiment of the present invention will be explained below with reference to the drawings. The drawings relate to an embodiment of the present invention, in which FIG. 1 is a schematic configuration diagram of a driving support apparatus mounted on a vehicle, FIG. 2 is a flowchart showing a cruise control routine, FIG. 3 is a flowchart showing a standby mode determining sub-routine, FIG. 4 is a flowchart showing a routine of controlling display on a display device for cruise control, FIGS. 5A to 5D are explanatory diagrams showing patterns of relations of a subject vehicle and a preceding vehicle with a traffic signal, FIG. 6A is an explanatory diagram showing indicators on the display device for cruise control, FIG. 6B is an explanatory diagram showing an example of display when a preceding vehicle is a target object, FIG. 6C is an explanatory diagram showing an example of display when a traffic signal is a target object, and FIG. 7 is a plan view showing an example of a cruise control switch.

Figure 1:
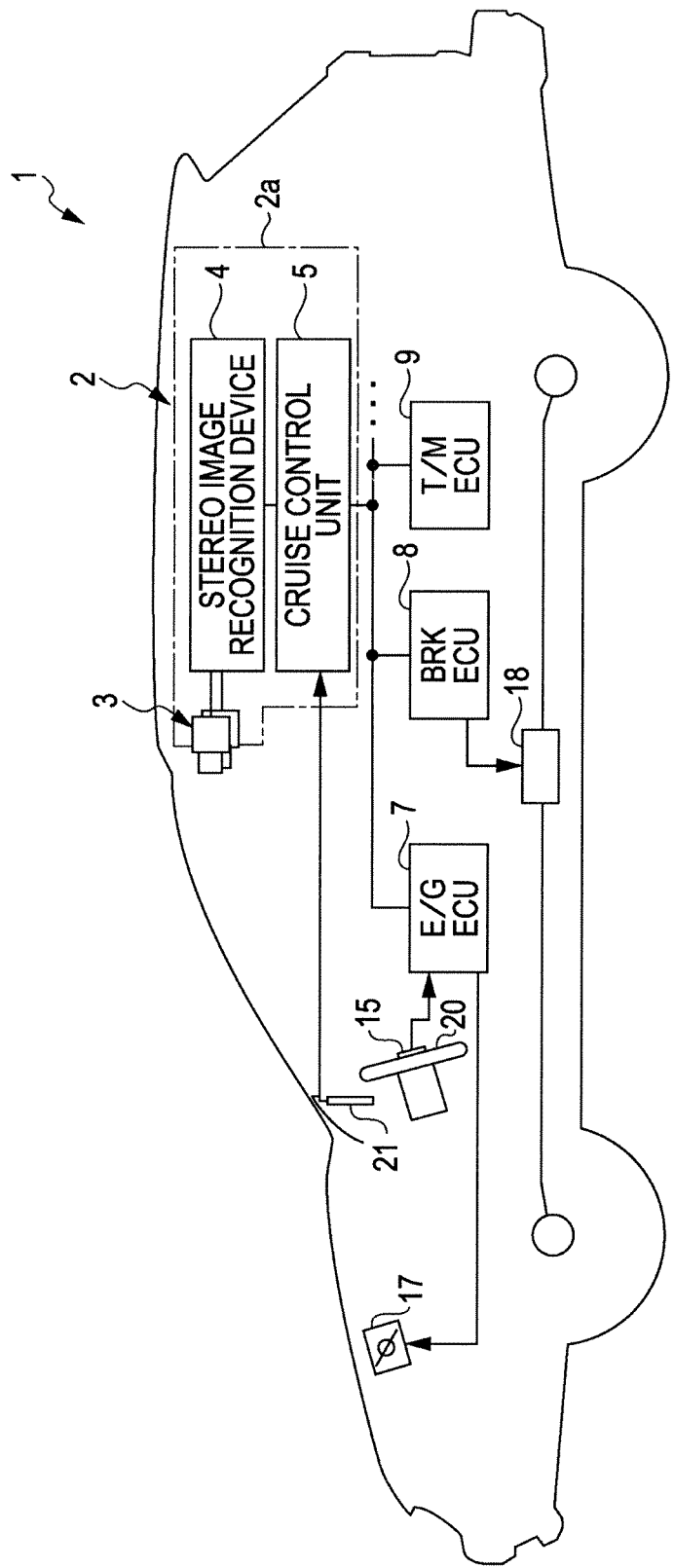
FIG. 1 is a schematic configuration diagram of a driving support apparatus mounted on a vehicle.

In FIG. 1, a vehicle (subject vehicle) such as a passenger car, represented by reference numeral 1, has a driving support apparatus 2 mounted thereon having an adaptive cruise control (ACC) function.

The driving support apparatus 2 includes, for example, a main part mainly constituted by a stereo camera assembly 2a integrally including a stereo camera 3 that is an image capturing unit, a stereo image recognition device 4 and a cruise control unit 5. Various control units such as an engine control unit (E/G_ECU) 7, a brake control unit (BRK_ECU) 8 and a transmission control unit (T/M_ECU) 9 are connected to the cruise control unit 5 of the stereo camera assembly 2a such that the units can communicate with one another.

The stereo camera 3 includes, as a stereo optical system, a pair of left and right CCD cameras having solid state imaging devices such as charge-coupled devices (CCDs), for example. The CCD cameras constituting the stereo camera 3 are attached on front portions of a ceiling of a passenger compartment with a predetermined distance therebetween, and are configured to capture images of external subjects in stereo from different points of view and output the captured image information to the stereo image recognition device 4.

The image information from the stereo camera 3 is input to the stereo image recognition device 4. In addition, a subject vehicle speed V from the T/M_ECU 9, for example, and the like are input to the stereo image recognition device 4. The stereo image recognition device 4 recognizes forward information such as three-dimensional object data and white line data ahead of the subject vehicle 1 based on the image information from the stereo camera 3, and estimates the road on which the subject vehicle 1 is traveling based on the recognized information. The stereo image recognition device 4 also detects a preceding vehicle on the road on which the subject vehicle 1 is traveling based on the recognized three-dimensional object data or the like.

The stereo image recognition device 4 processes the image information from the stereo camera 3 as follows, for example. The stereo image recognition device 4 generates distance information from a difference between corresponding positions in a pair of left and right images (referred to as a stereo image pair), which is obtained by capturing the environment ahead of the subject vehicle 1 in the traveling direction with the stereo camera 3, based on a principle of triangulation. Specifically, the stereo image recognition device 4 divides a reference image (the right image, for example) into small regions of 4×4 pixels, for example, compares a luminance or color pattern of each small region with that of the comparison image to find a region in the comparison image corresponding thereto and obtain a distance distribution over the entire reference image. The stereo image recognition device 4 further examines a luminance difference from adjacent pixels (adjacent pixels on the right and right below, for example) for each pixel of the reference image, extracts pixels with both of these luminance differences larger than a threshold as edges, and adds distance information to the extracted pixels (edges) to generate a distribution image (distance image) of the edges having the distance information. The stereo image recognition device 4 then performs a known grouping process on the distance image and a pattern matching process with various preset templates to recognize a lane line, a side wall, a three-dimensional object and the like in front of the subject vehicle. The stereo image recognition device 4 then assigns different IDs to the respective recognized data, and monitors the data continuously through frames for each ID. Then, the stereo image recognition device 4 estimates the road on which the subject vehicle 1 is traveling based on the lane line data, the side-wall data and the like, and extracts (detects) a three-dimensional object that is present on the road and that moves at a predetermined speed (0 km/h or higher, for example) substantially in the same direction as the subject vehicle 1 as a preceding vehicle. If a preceding vehicle is detected, the stereo image recognition device 4 calculates a distance Dcar to the preceding vehicle (=inter-vehicle distance), a preceding vehicle speed Vf (=(a rate of change of the inter-vehicle distance Dcar)+(a subject vehicle speed V)), a preceding vehicle acceleration of (=a differential value of the preceding vehicle speed Vf) and the like as information on the vehicle in front. A vehicle among preceding vehicles that travels particularly at a speed Vf of a predetermined value or lower (4 km/h or lower, for example) and that is not accelerated is recognized as a preceding vehicle in a substantially stopped state.

During such image information processing, the stereo image recognition device 4 also recognizes a traffic signal (a stop signal) displaying an instruction that the subject vehicle 1 should stop on the road. Specifically, the stereo image recognition device 4 has template data for various traffic signals and the like stored therein, for example, and recognizes a traffic signal above a road on which the subject vehicle is traveling by pattern matching with the templates. The stereo image recognition device 4 further examines a luminance gradient of a recognized traffic signal, for example, and determines whether or not the traffic signal instructs the subject vehicle 1 should stop (that is, whether or not the traffic signal displays an yellow or red light) based on a position, a color, or the like of a region with a high luminance. The stereo image recognition device 4 then recognizes the traffic signal displaying the instruction that the subject vehicle should stop as a stop signal.

As described above, the stereo image recognition device 4 serves as a preceding vehicle recognizing unit and a stop signal recognizing unit in the present embodiment.

Various recognized information on an environment in front and outside of the subject vehicle 1 from the stereo image recognition device 4 and the subject vehicle speed V from the T/M_ECU 9, for example, are input to the cruise control unit 5.

In addition, various input signals input through a cruise control switch 15 operated by a driver, for example, are input to the cruise control unit via the E/G_ECU 7. In the present embodiment, the cruise control switch 15 is an operation switch constituted by push switches, toggle switches and the like disposed on a steering 20, and has a cruise switch (CRUISE) 15*a* that is a main switch for turning the operation of the ACC on/off, a set switch (SET) 15*b* for setting a current speed of the subject vehicle 1 as a set vehicle speed Vset, a resume switch (RES) 15*c* for resetting the set vehicle speed Vset stored previously, an inter-vehicle distance setting switch 15*d* for setting a mode of the inter-vehicle distance between a preceding vehicle and the subject vehicle, and a cancel switch (CANCEL) 15*e* for canceling the ACC. In the present embodiment, the set switch 15*b* serves as both a deceleration switch (∇) of instructing deceleration of the subject vehicle 1 and a down switch (−) of tapping down the set vehicle speed in units of a set value to a lower speed. The resume switch 15*c* serves as both an acceleration switch (Δ) of instructing acceleration of the subject vehicle 1 and an up switch (+) of tapping up the set vehicle in units of a set value to a higher speed.

In addition, a display device 21 for cruise control that is a display device for displaying setting information, control information and the like on the ACC is connected to the cruise control unit 5. In the present embodiment, as shown in FIG. 3A, for example, the display device 21 includes a set vehicle speed display indicator 21*a* for displaying the set vehicle speed Vset, a preceding vehicle display indicator 21*b* for displaying a preceding vehicle, an inter-vehicle distance mode display indicator 21*c* for displaying an inter-vehicle distance mode (described later) with respect to a preceding vehicle, and a traffic signal display indicator 21*d* for displaying a stop signal and the like. The display device 21 is disposed on an instrument cluster, for example.

When the cruise switch 15*a* is turned on and then the set switch 15*b* is operated by the driver, for example, the cruise control unit 5 sets the subject vehicle speed V at the time of this operation as the set vehicle speed Vset. As another example, when the resume switch 15*c* is operated by the driver, the cruise control unit 5 sets the set vehicle speed that is previously set as the current set vehicle speed Vset. In this case, the cruise control unit 5 selectively lights up segments constituting the set vehicle speed display indicator 21*a* on the display device 21, and maintains the display state.

When the inter-vehicle distance setting switch 15*d* is operated by the driver, the cruise control unit 5 sets an inter-vehicle distance mode (such as any one of "long", "medium" and "short" inter-vehicle distance modes) for setting a follow-up target distance Dtrg, which will be described later. In this case, the cruise control unit 5 displays the current inter-vehicle distance mode by changing the number of lit segments constituting the inter-vehicle distance mode display indicator 21*c* on the display device 21.

Then, when the set vehicle speed Vset and the inter-vehicle distance mode are set in this manner, the cruise control unit 5 performs the ACC.

The cruise control unit 5 performs, as the ACC, constant speed cruise control that brings the subject vehicle speed V closer to the set vehicle speed Vset when no preceding vehicle is detected by the stereo image recognition device 4. On the other hand, the cruise control unit 5 performs follow-up cruise control (including follow-up stopping and follow-up starting) that brings the inter-vehicle distance Dcar between the subject vehicle 1 and a preceding vehicle closer to the follow-up target distance Dtrg when such a preceding vehicle is recognized by the stereo image recognition device 4 during the constant speed cruise control.

Thus, when the constant speed cruise control is started, the cruise control unit 5 calculates a target acceleration (constant speed cruise target acceleration) aset for bringing the subject vehicle speed V closer to the set vehicle speed Vset.

Specifically, the cruise control unit 5 calculates a vehicle speed deviation Vsrel (=Vset−V) between the subject vehicle speed V and the set vehicle speed Vset and refers to a map or the like set in advance to calculate the target acceleration aset based on the vehicle speed deviation Vsrel and the subject vehicle speed V. If the vehicle speed deviation Vsrel is a positive value, for example, the target acceleration aset is set to a larger value as the vehicle speed deviation Vsrel is larger, within a range up to an upper limit based on the subject vehicle speed V. On the other hand, if the vehicle speed deviation Vsrel is a negative value, the target acceleration aset is set to a smaller value as the vehicle speed deviation Vsrel is smaller, within a range up to a lower limit based on the subject vehicle speed V (the target acceleration aset is set to a larger value as a deceleration as the vehicle speed deviation Vsrel is larger on the negative side).

When the control shifts from the constant speed cruise control to the follow-up cruise control, the cruise control unit 5 calculates the target acceleration aset described above as well as a target acceleration (follow-up cruise target acceleration) acar for bringing the inter-vehicle distance Dcar closer to the follow-up target distance Dtrg.

Specifically, the cruise control unit 5 has maps set and stored therein in advance for setting a follow-up target distance Dtrg associated with the "short" and "long" inter-vehicle distance modes, for example. Then, the cruise control unit 5 sets the follow-up target distance Dtrg based on the subject vehicle speed V using the associated map in the "short" mode or the "long" mode, or sets an intermediate value between the values calculated in the "short" mode and the "long" mode as the follow-up target distance Dtrg in the "medium" mode. The cruise control unit 5 also calculates a distance deviation ΔD Dtrg−Dcar) between the follow-up target distance Dtrg and the inter-vehicle distance Dcar, calculates a relative distance Vfrel (=Vf−V) between the preceding vehicle speed Vf and the subject vehicle speed V, and refers to a map or the like set in advance using the calculation results as parameters to calculate the target acceleration acar.

Figure 5A:
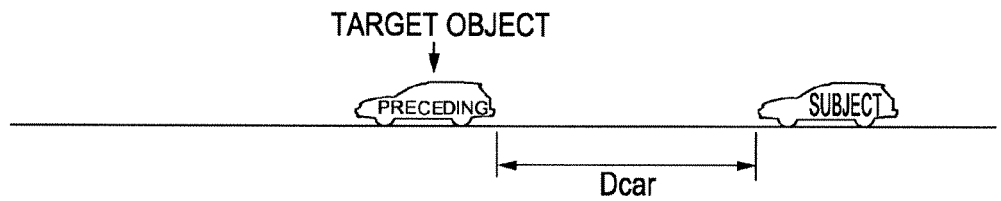
FIGS. 5A to 5D are explanatory diagrams showing patterns of relations of a subject vehicle and a preceding vehicle with a traffic signal.
Figure 5B:
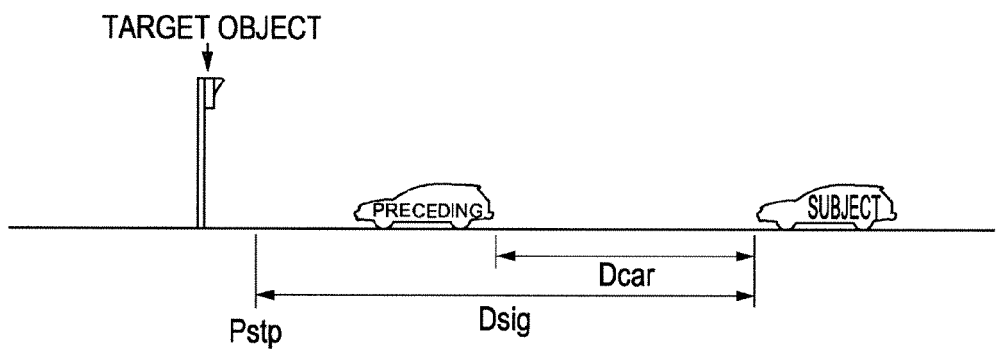
Figure 5C:
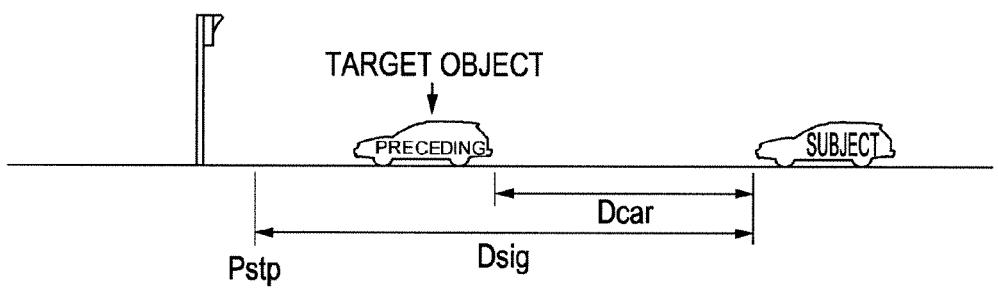
Figure 5D:
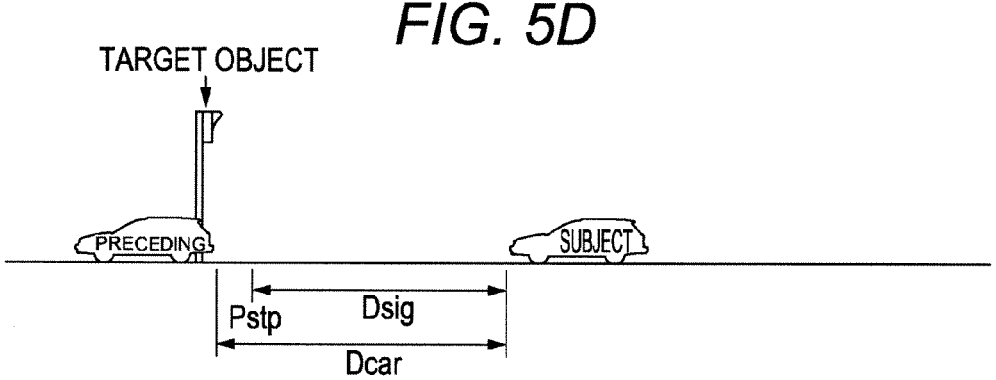

Even if a preceding vehicle is recognized, however, in the case where a stop signal is recognized in addition to the preceding vehicle and the preceding vehicle is traveling over a stop position Pstp set at a predetermined distance short of the stop signal (or in the case where the preceding vehicle is determined to be highly likely to travel past the stop signal), the cruise control unit 5 excludes the preceding vehicle from target objects so as to prevent unnecessary acceleration or the like of the subject vehicle 1 (see FIG. 5D, for example). In this case, the cruise control unit 5 compares the inter-vehicle distance Dcar and the distance (stop distance) Dsig from the subject vehicle 1 to the stop position Pstp of the stop signal, for example, and determines that the vehicle in front has traveled past the stop position Pstp of the stop signal when the inter-vehicle distance Dcar exceeds the stop distance Dsig. The cruise control unit 5 also calculates a time Tp (=(Dsig−Dcar)/Vf) required for the preceding vehicle traveling at a vehicle speed of Vf to travel past the stop position Pstp, and determines that the preceding vehicle is highly likely to travel past the stop position Pstp of the stop signal when the required time Tp is a preset value Tth or less and the deceleration of the preceding vehicle is a preset value or lower.

In addition, when a stop signal is recognized by the stereo image recognition device 4, the cruise control unit 5 calculates a target acceleration (traffic signal target acceleration) asig required for stopping the subject vehicle 1 at a stop position (a position 10 m short of the stop signal, for example) Pstp. Specifically, the cruise control unit 5 refers to a preset map or the like using the stop distance Dsig and the subject vehicle speed V as parameters, for example, to calculate the target acceleration asig.

When the follow-up cruise target acceleration acar is not calculated and the traffic signal target acceleration asig is calculated (that is, when a preceding vehicle is not recognized and a stop signal is recognized), the cruise control unit 5 substitutes the value of the traffic signal target acceleration asig for the follow-up cruise target acceleration acar. When the follow-up cruise target acceleration acar and the traffic signal target acceleration asig are calculated and the traffic target acceleration asig is smaller than the follow-up cruise target acceleration acar, the value of the traffic signal target acceleration asig is substituted for the follow-up cruise target acceleration acar.

After calculating the various target accelerations in this manner, during the constant speed cruise control in which only the constant speed cruise target acceleration aset is calculated, the cruise control unit 5 sets the target acceleration aset as a final target acceleration a, and during the follow-up cruise control in which the constant speed cruise target acceleration aset and the follow-up cruise target acceleration acar are calculated, the cruise control unit 5 sets the smaller of the target accelerations aset and acar as the final target acceleration a.

After setting the target acceleration a, the cruise control unit 5 produces an acceleration corresponding to the target acceleration a by controlling the opening degree of an electronic control throttle valve 17 (controlling an engine output) through the E/G_ECU 7. Furthermore, if it is determined that a sufficient acceleration (deceleration) cannot be obtained only by controlling the engine output, the cruise control unit 5 controls a hydraulic pressure output from a brake booster 18 (controls automatic brake application) through the BRK_ECU 8.

During such an ACC, when the cruise control in which a preceding vehicle is the target object is performed, the cruise control unit 5 lights the preceding vehicle display indicator 21*b* and the inter-vehicle distance mode display indicator 21*c* (see FIG. 6B), and when the cruise control in which the stop signal is the target object is performed, the cruise control unit 5 lights the traffic signal display indicator 21*d* (see FIG. 6C).

Note that when the traffic signal target acceleration asig is substituted for the follow-up cruise target acceleration acar, the subject vehicle 1 is controlled to stop at the stop position Pstp for use in the control set uniformly before the stop signal, for example. However, positions of actual stop lines on roads are set to various positions depending on the road types and the like, and the position at which the subject vehicle 1 should stop in relation to the traffic signal also changes depending on the presence or absence of a preceding vehicle, the number of preceding vehicles and the like. Accordingly, it is not practical to control the subject vehicle 1 to stop at a uniformly set stop position Pstp in relation to the stop signal. Moreover, in the present embodiment that uses a camera to recognize a traffic signal, the traffic signal may move out of the imaging range as the subject vehicle 1 approaches immediately before the traffic signal. Thus, there are many uncertain factors for control in stop control in relation to a traffic signal. Therefore, in the present embodiment, when the traffic signal target acceleration asig is substituted for the follow-up cruise target acceleration acar, the cruise control unit 5 enters the standby mode under a preset condition so as to leave to the driver whether to stop the subject vehicle 1 in relation to the stop signal. Specifically, when the subject vehicle speed V is lower than a preset vehicle speed Vth (Vth=10 km/h, for example) or when the stop distance Dsig to the stop position Pstp is shorter than a preset distance Dth (Dth=30 m, for example), for example, the cruise control unit 5 enters the standby mode. After entering the standby mode, the cruise control unit 5 calculates, as the final target acceleration a, another target acceleration (standby cruise target acceleration) asta for bringing the subject vehicle speed V closer to a preset very low target vehicle speed V0 (V0=5 to 10 km/h, for example).

The cruise control unit 5 displays the traffic signal display indicator 21*d* in a blinking state, for example, during the standby mode.

As described above, the cruise control unit 5 implements in the present embodiment the functions as a constant speed cruise target acceleration calculating unit, a follow-up cruise target acceleration calculating unit, an acceleration/deceleration controlling unit, a traffic signal target acceleration calculating unit and a standby cruise target acceleration calculating unit.

Next, cruise control performed by the cruise control unit 5 will be described according to the flowchart of a cruise control routine in FIG. 2. The routine is repeated at every preset time. When the routine is started, the cruise control unit 5 first refers to a map or the like set in advance using the vehicle speed deviation between the subject vehicle speed V and the set vehicle speed Vset to calculate the constant speed cruise target acceleration aset in step S101.

Next, in step S102, the cruise control unit 5 checks whether or not a preceding vehicle traveling ahead on the road on which the subject vehicle 1 is traveling has been recognized. Specifically, the cruise control unit 5 checks whether or not a preceding vehicle traveling ahead of the road on which the subject vehicle is traveling by the stereo image recognition device 4 and whether or not the preceding vehicle is excluded from the target object for the ACC based on the relation with a stop signal.

If it is determined in step S102 that a preceding vehicle ahead on the road on which the subject vehicle is traveling has been recognized and the preceding vehicle is not excluded from the target object for the ACC, the cruise control unit 5 proceeds to step S103 where it refers to a map or the like set in advance using the distance deviation ΔD between the follow-up target distance Dtrg and the inter-vehicle distance Dcar with respect to the preceding vehicle and the relative speed Vfrel between the preceding vehicle speed Vf and the subject vehicle speed Vfrel as parameters and calculates the follow-up cruise target acceleration acar. Then, the cruise control unit 5 proceeds to step S104.

On the other hand, if it is determined in step S102 that no preceding vehicle ahead on the road on which the subject vehicle is traveling is recognized or if it is determined that a preceding vehicle is excluded from the target object based on the relation with the stop signal even when such a preceding vehicle is recognized ahead on the road on which the subject vehicle is traveling, the cruise control unit 5 proceeds to step S104 without making any change.

In step S104 after step S102 or step S103, the cruise control unit 5 examines whether or not a stop signal for the subject vehicle 1 is recognized ahead on the road on which the subject vehicle 1 is traveling.

If it is determined in step S104 that a stop signal is recognized ahead on the road on which the subject vehicle is traveling, the cruise control unit 5 proceeds to step S105, where it refers to a map or the like set in advance using the stop distance Dsig to the stop signal and the subject vehicle speed V as parameters and calculates the traffic signal target acceleration asig, for example. Then, the cruise control unit 5 proceeds to step S106.

On the other hand, if it is determined in step S104 that no stop signal is recognized ahead on the road on which the subject vehicle is traveling, the cruise control unit 5 proceeds to step S106 without making any change.

In step S106 after step S104 or step S105, the cruise control unit 5 resets the smaller of the follow-up cruise target acceleration acar and the traffic signal target acceleration asig that are currently calculated as the follow-up cruise target acceleration acar as appropriate (acar=min (acar, asig)).

Specifically, when only the follow-up cruise target acceleration acar is calculated or when the follow-up cruise target acceleration acar and the traffic signal target acceleration asig are calculated and the follow-up cruise target acceleration acar is smaller than the traffic signal target acceleration asig, the cruise control unit 5 resets the follow-up target acceleration acar that is currently calculated as the follow-up cruise target acceleration acar. Thus, in such a case, a follow-up cruise target acceleration acar obtained using the preceding vehicle as a target object is set as the follow-up cruise target acceleration acar (see, for example, FIGS. 5A and 5C).

When only the traffic signal target acceleration asig is calculated, the cruise control unit 5 uses the value of the traffic signal target acceleration asig as the follow-up cruise target acceleration acar. Thus, in such a case, a follow-up cruise target acceleration acar obtained using the stop signal as a target object is set (see, for example, FIG. 5D).

When the follow-up cruise target acceleration acar and the traffic signal target acceleration asig are calculated and the traffic target acceleration asig is smaller than the follow-up cruise target acceleration acar, the cruise control unit 5 uses the value of the traffic signal target acceleration asig as the follow-up cruise target acceleration acar. Thus, in such a case, a follow-up cruise target acceleration acar obtained using the stop signal instead of the preceding vehicle as a target object is set as the follow-up cruise target acceleration acar (see, for example, FIG. 5B).

In step S107 after step S106, the cruise control unit 5 sets, as the final target acceleration a, the constant speed cruise target acceleration aset when only the constant speed cruise target acceleration aset is calculated or the smaller of the constant speed cruise target acceleration aset and the follow-up cruise target acceleration acar when these are calculated.

In a subsequent step S108, the cruise control unit 5 determines whether or not to perform the standby mode of the ACC. This determination on the standby mode is performed according to a flowchart of a standby mode determining sub-routine shown in FIG. 3, for example. When the sub-routine is started, the cruise control unit 5 first examines whether or not the standby mode is currently being performed in step S201.

If it is determined in step S201 that the standby mode is being performed, the cruise control unit 5 proceeds to step S207. If it is determined that the standby mode is not being performed, the cruise control unit 5 proceeds to step S202.

In step S202 after step S201, the cruise control unit 5 examines whether or not the constant speed cruise target acceleration aset is set as the final target acceleration a in step S107 described above.

If it is determined in step S202 that the constant speed cruise target acceleration aset is set as the final target acceleration a, the cruise control unit 5 exits the sub-routine without any change.

On the other hand, if it is determined in step S202 that the follow-up cruise target acceleration acar is set as the final target acceleration a, the cruise control unit 5 proceeds to step S203 where it examines whether the target acceleration a is set to the follow-up cruise target acceleration aset by using the preceding vehicle as the target object.

If it is determined in step S203 that the target acceleration a is set by using the preceding vehicle as the target object, the cruise control unit 5 exits the sub-routine without any change.

On the other hand, if it is determined in step S203 that the target acceleration a is not set by using the preceding vehicle as the target object, that is, if it is determined that the target acceleration a is set by using the stop signal as the target object, the cruise control unit 5 proceeds to step S204, where it examines whether or not the current subject speed V is a constant speed lower than a preset threshold Vth (Vth=10 km/h, for example).

If it is determined in step S204 that the subject vehicle speed V is lower than the preset threshold Vth, the cruise control unit 5 proceeds to step S206.

On the other hand, if it is determined in step S204 that the subject vehicle speed V is the set threshold Vth or higher, the cruise control unit 5 proceeds to step S205, where it examines whether or not the stop distance Dsig to the stop position Pstp of the stop signal is shorter than a preset distance Dth (Dth=30 m, for example).

If it is determined in step S205 that the stop distance Dsig is the preset distance Dth or longer, the cruise control unit 5 exits the sub-routine without any change. If it is determined that the stop distance Dsig is shorter than the preset distance Dth, the cruise control unit 5 proceeds to step S206.

In step S206 after step S204 or step S205, the cruise control unit 5 performs the standby mode, and then exits the sub-routine.

In step S207 after step S201, the cruise control unit 5 examines whether the set switch 15b or the resume switch 15c is operated by the driver, for example.

If it is determined in step S207 that no operational input is made by the driver, the cruise control unit 5 maintains the standby mode and exits the sub-routine.

On the other hand, if it is determined in step S207 that an operational input is made by the driver, the cruise control unit 5 cancels the standby mode and exits the sub-routine.

In step S109 after step S108 in the main routine of FIG. 2, the cruise control unit 5 examines whether or not the standby mode is currently being performed.

If it is determined in step S109 that the standby mode is cancelled, the cruise control unit 5 proceeds to step S111.

On the other hand, if it is determined in step S109 that the standby mode is being performed, the cruise control unit 5 proceeds to step S110, where it recalculates the final target acceleration a, and then to step S111. Specifically, in step S110, the cruise control unit 5 recalculates a standby cruise target acceleration asta for bringing the subject vehicle speed V closer to a preset very low target vehicle speed V0 (V0=5 to 10 km/h, for example) as the final target acceleration a.

Then, in step S111 after step S109 or S110, the cruise control unit 5 controls acceleration and deceleration of the subject vehicle 1 by controlling the opening degree of the electronic control throttle valve 17 (engine output control) or the hydraulic pressure output from the brake booster 18 (automatic brake application control) based on the final target acceleration a that is currently calculated, and then exits the routine.

Next, display control of the display device 21 for cruise control performed concurrently during the cruise control described above by the cruise control unit 5 will be described with reference to a flowchart of a display control routine of FIG. 4. This routine is repeated at every preset time. When the routine is started, the cruise control unit 5 first displays the set vehicle speed Vset currently set by the driver by lighting the set vehicle speed display indicator 21a in step S301.

Next, in step S302, the cruise control unit 5 examines whether or not the standby mode is currently performed.

If it is determined in step S302 that the standby mode is being performed, the cruise control unit 5 proceeds to step S307. If it is determined that the standby mode is not being performed, the cruise control unit 5 proceeds to step S303.

In step S303 after step S302, the cruise control unit 5 examines whether or not the current target object is the preceding vehicle, that is, whether or not the current final target acceleration a is set based on the preceding vehicle.

If it is determined in step S303 that the current target object is the preceding vehicle, the cruise control unit 5 proceeds to step S306, where it lights the preceding vehicle display indicator 21b and displays the current inter-vehicle distance mode by lighting the inter-vehicle distance mode display indicator 21c, and then exits the routine. As a result, the preceding vehicle and the inter-vehicle distance mode are displayed in a lit state in addition to the current set vehicle speed Vset on the display device 21 for cruise control as shown in FIG. 6B, for example.

On the other hand, if it is determined in step S303 that the target object is not a preceding vehicle, the cruise control unit 5 proceeds to step S304, where it examines whether or not the current target object is a stop signal, that is, whether or not the current final target acceleration a is set based on a stop signal.

If it is determined in step S304 that the current target object is a stop signal, the cruise control unit 5 proceeds to step S305 where it lights the traffic signal display indicator 21d, and then exits the routine. As a result, the stop signal is displayed in a lit state in addition to the current set vehicle speed Vset on the display device 21 for cruise control as shown in FIG. 6C, for example.

On the other hand, if it is determined in step S304 that the current target object is not a stop signal, that is, if it is determined that the current final target acceleration a is set based on the set vehicle speed Vset, the cruise control unit 5 exits the routine without any change. As a result, only the current set vehicle speed Vset is displayed in a lit state (not shown) on the display device 21 for cruise control.

In step S307 after step S302, the cruise control unit 5 displays the traffic signal display indicator 21d in a blinking state, and then exits the routine. As a result, the current set vehicle speed Vset is displayed in a lit state and the stop signal is displayed in a blinking state on the display device 21 for cruise control (not shown).

According to such an embodiment, in cruise control performing acceleration/deceleration control of a subject vehicle by selectively using a constant speed cruise target acceleration aset for bringing a subject vehicle speed V closer to a set vehicle speed Vset or a follow-up cruise target acceleration acar for follow-up cruise following a preceding vehicle, when a stop signal is recognized by the stereo image recognition device 4, a traffic signal target acceleration asig for stopping the subject vehicle 1 at a stop position P of the stop signal is calculated, the traffic signal target acceleration asig is used as a follow-up cruise target acceleration acar when the follow-up cruise target acceleration acar is not calculated and the traffic signal target acceleration asig is calculated, or the value of the traffic signal target acceleration asig is substituted for the follow-up cruise target acceleration acar when both of the follow-up cruise target acceleration acar and the traffic signal target acceleration asig are calculated and the traffic signal target acceleration asig is smaller than the follow-up cruise target acceleration. Accordingly, the control is performed against an extended range of objects to cover a traffic signal present on a road on which the subject vehicle is traveling in addition to a preceding vehicle, and suitable cruise control can thus be performed.

In this case, when a preceding vehicle and a stop signal are recognized by the stereo image recognition device 4 and the preceding vehicle has traveled past a stop position Pstp set a predetermined distance before the stop signal (or when it is determined that the preceding vehicle is highly likely to travel past the stop signal), it is possible to prevent the subject vehicle 1 from being affected by the preceding vehicle that will not stop at the stop signal and from being unnecessarily accelerated or decelerated by excluding the preceding vehicle from target objects. In other words, when a preceding vehicle is sufficiently decelerating so as to stop before a stop signal, the subject vehicle can stop following the preceding vehicle, but, in contrast, when a preceding vehicle will not stop before a stop signal, the subject vehicle can be controlled to be decelerated toward the stop signal without being affected by the preceding vehicle.

In addition, in the case where the traffic signal target acceleration asig is substituted for the follow-up cruise target acceleration acar, when the subject vehicle speed V is a low speed lower than a preset vehicle speed Vth or when the stop distance Dsig to the stop position Pstp is shorter than a preset distance Dth, the standby mode is entered, the subject vehicle speed V is kept at a very low preset target vehicle speed V0, and stopping of the subject vehicle 1 is left to the driver's operation of the brake or the like. Accordingly, it is possible to realize cruise control that does not cause any uncomfortable feeling even when the range of target objects is extended to cover traffic signals.

Moreover, the preceding vehicle display indicator 21a is displayed in a lit state or the traffic signal display indicator 21d is displayed in a lit state by display control on the display device 21 for cruise control, and it is displayed whether a preceding vehicle is the target object or a stop signal is the target object in the current cruise control. Accordingly, it is possible to clearly present to the driver what is the target object based on which the subject vehicle 1 is accelerated or decelerated even when the range of target objects is extended to cover stop signals.

Note that the present invention is not limited to the embodiment described above, and various variations and modifications are possible, and that such variations and modifications are within the technical scope of the present invention.

What is claimed is:

1. A driving support apparatus for a vehicle, comprising:
   a constant speed cruise target acceleration calculating unit configured to calculate a constant speed cruise target acceleration for bringing a subject vehicle speed closer to a set vehicle speed set by a driver;
   a preceding vehicle recognizing unit configured to recognize a preceding vehicle;
   a follow-up cruise target acceleration calculating unit configured to calculate a follow-up cruise target acceleration for a follow-up cruise following a preceding vehicle when the preceding vehicle is recognized by the preceding vehicle recognizing unit;
   an acceleration/deceleration controlling unit configured to control an acceleration/deceleration of the subject vehicle by selectively using the constant speed cruise target acceleration or the follow-up cruise target acceleration;
   a stop signal recognizing unit configured to recognize a traffic signal displaying an instruction to stop to the subject vehicle; and a traffic signal target acceleration calculating unit configured to calculate a traffic signal target acceleration for stopping the subject vehicle at a stop position of a stop signal when the stop signal is recognized by the stop signal recognizing unit, wherein the follow-up cruise target acceleration calculating unit substitutes a value of the traffic signal target acceleration for the follow-up cruise target acceleration when the follow-up cruise target acceleration is not calculated and the traffic signal target acceleration is calculated, and substitutes the value of the traffic signal target acceleration for the follow-up cruise target acceleration when the follow-up cruise target acceleration and the traffic signal target acceleration are calculated and the traffic signal target acceleration is smaller than the follow-up cruise target acceleration, and wherein, when the proceeding vehicle will not stop before the stop signal, the subject vehicle can be controlled to be decelerated toward the stop signal without being affected by the proceeding vehicle.

2. The driving support apparatus for a vehicle according to claim 1, wherein, when the preceding vehicle and the stop signal are recognized and it is determined that the preceding vehicle has traveled past the stop position of the stop signal, the follow-up cruise target acceleration calculating unit excludes the preceding vehicle from a target object.

3. The driving support apparatus for a vehicle according to claim 2, wherein, when an inter-vehicle distance to the preceding vehicle is longer than a distance to the stop position of the stop signal, the follow-up cruise target acceleration calculating unit determines that the preceding vehicle has traveled past the stop position of the stop signal.

4. The driving support apparatus for a vehicle according to claim 3, wherein, when the preceding vehicle and the stop signal are recognized and it is determined that the preceding vehicle is likely to travel past the stop signal, the follow-up cruise target acceleration calculating unit excludes the preceding vehicle from a target object.

5. The driving support apparatus for a vehicle according to claim 4, wherein the follow-up cruise target acceleration calculating unit calculates a time required for the preceding vehicle to travel past the stop position of the stop signal when the preceding vehicle travels at a current vehicle speed, and determines that the preceding vehicle is likely to travel past the stop signal when the required time is equal to or less than a preset value and a deceleration of the preceding vehicle is equal to or less than a preset value.

6. The driving support apparatus for a vehicle according to claim 2, wherein, when the preceding vehicle and the stop signal are recognized and it is determined that the preceding vehicle is likely to travel past the stop signal, the follow-up cruise target acceleration calculating unit excludes the preceding vehicle from a target object.

7. The driving support apparatus for a vehicle according to claim 6, wherein the follow-up cruise target acceleration calculating unit calculates a time required for the preceding vehicle to travel past the stop position of the stop signal when the preceding vehicle travels at a current vehicle speed, and determines that the preceding vehicle is likely to travel past the stop signal when the required time is qual to or less than a preset value and a deceleration of the preceding vehicle is equal to or less than a preset value.

8. The driving support apparatus for a vehicle according to claim 1, wherein when the preceding vehicle and the stop signal are recognized and it is determined that the preceding vehicle is likely to travel past the stop signal, the follow-up cruise target acceleration calculating unit excludes the preceding vehicle from a target object.

9. The driving support apparatus for a vehicle according to claim 8, wherein the follow-up cruise target acceleration calculating unit calculates a time required for the preceding vehicle to travel past the stop position of the stop signal when the preceding vehicle travels at a current vehicle speed, and determines that the preceding vehicle is likely to travel past the stop signal when the required time is equal to or less than a preset value and a deceleration of the preceding vehicle is equal to or less than a preset value.

10. The driving support apparatus for a vehicle according to claim 1, further comprising a standby cruise target acceleration calculating unit configured to calculate a standby cruise target acceleration for making the subject vehicle travel at a very low preset speed when the traffic signal target acceleration is used as the follow-up cruise target acceleration and when the subject vehicle speed is a low speed lower than a preset vehicle speed or a distance to the stop position of the stop signal is shorter than a preset distance, wherein the acceleration/deceleration controlling unit controls acceleration/deceleration of the subject vehicle by using the standby cruise target acceleration when the standby cruise target acceleration is calculated.

11. The driving support apparatus for a vehicle according to claim 1, further comprising a display unit configured, when an acceleration/deceleration control using the follow-up cruise target acceleration is performed, to display whether the acceleration/deceleration control is using the preceding vehicle or the stop signal as the target object.

12. The driving support apparatus for a vehicle according to claim 11, wherein the display unit is further configured to display the preceding vehicle.

13. The driving support apparatus for a vehicle according to claim 1, wherein the constant speed cruise target acceleration calculating unit sets an inter-vehicle distance mode for setting a follow-up target distance.

* * * * *